J. McWENIE.
SPECTACLES.
APPLICATION FILED MAR. 12, 1915.
1,247,853.
Patented Nov. 27, 1917.
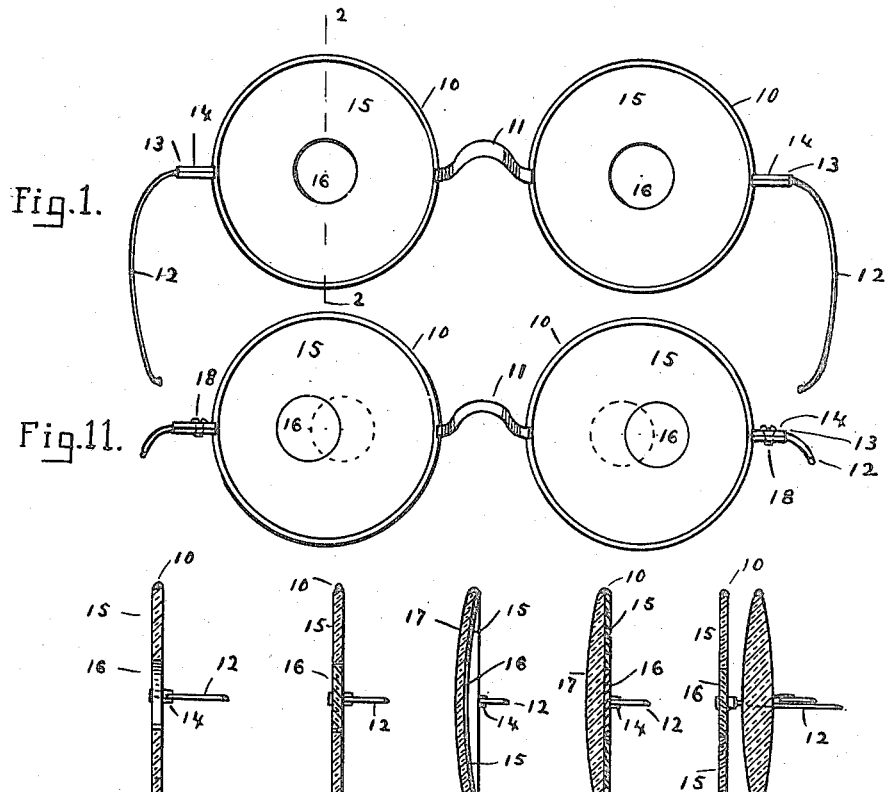

UNITED STATES PATENT OFFICE.

JOSEPH McWENIE, OF WHITESBORO, NEW YORK.

SPECTACLES.

1,247,853.  Specification of Letters Patent.  Patented Nov. 27, 1917.

Application filed March 12, 1915. Serial No. 13,960.

*To all whom it may concern:*

Be it known that I, JOSEPH McWENIE, of Whitesboro, in the county of Oneida and State of New York, have invented certain new and useful Improvements in Spectacles; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to spectacles, goggles or similar articles designed to be used to relieve the eyes from the strain of too much intense light.

The purpose of my invention is to provide in articles of the character described means for reducing the amount of light transmitted to the eye as required by the general character of such articles in combination with means for permitting the eye to have an unobstructed vision in one direction, preferably directly in front of the eye.

A further purpose is to provide spectacles or the like provided in the main with light-reducing material but having a part of their area adapted to transmit the full light.

One of the recognized disadvantages of using goggles or spectacles having lenses of light-reducing material such as tinted glass is that the whole field of vision is similarly affected and that the wearer cannot get an unobstructed or normally clear view of any part of the field of vision without removing the goggles entirely. To overcome this disadvantage is a further purpose of my invention.

Furthermore, my invention enables goggles or light-reducing spectacles to be used in many places where they have not been used before. For instance, the spectacles embodying my invention are especially adapted to be used under circumstances where the user must have a clear or unobstructed vision of some article or of some part of the field of vision and yet where the surrounding articles or balance of the field of vision reflects so much light to the eye as to be a strain thereupon.

Further purposes and advantages of my invention will be apparent from the specification and claims herein.

Figure 1 is a front view of a pair of spectacles or the like embodying my invention.

Fig. 2 is a sectional view on line 2—2 of Fig. 1, the clear vision part being a central aperture in the lenses.

Fig. 3 is a sectional view similar to Fig. 1 but with the aperture in the light-reducing lenses filled by clear glass or similar light-transmitting material.

Figs. 4 and 5 are sectional views similar to Fig. 2 of a third and fourth form or modification respectively of my invention.

Fig. 6 is a sectional view similar to Fig. 2 illustrating the lens such as shown in Fig. 2 placed in front of the lens of another pair of spectacles as by wearing spectacles embodying my invention in front of a pair of ordinary glasses.

Figs. 7, 8, and 9 are front views illustrating different relative arrangements of the light-reducing and light-transmitting materials in spectacles embodying my invention.

Fig. 10 is a front view of a lens having the clear vision portion located off of the center of the lens.

Fig. 11 is a front view of a pair of spectacles embodying my invention with the clear vision portion off of the center and with the lenses adjustably mounted in the frames.

Referring to the drawings in a more particular description, the lenses of the spectacles, goggles or similar articles are supported in proper position before the eye as by frames 10, nose-piece 11, bows 12 usually hinged at 13 to side projections 14 upon the frames 10. The lenses are composed for the greater part of their area of light-reducing material or materials, that is materials adapted to more or less reduce the amount of light that can pass therethrough to the eye and yet permit the person seeing through such material as is commonly done with goggles. This light-reducing material may be stained or tinted glass, stained or tinted isinglass, celluloid or other material having the quality desired usually used in spectacles or goggles.

In this main portion 15 of light-reducing material of the lenses, there is provided an area 16 of clear vision or through which the light may pass either entirely unobstructed or relatively so. This clear vision area 16 may be simply an aperture or hole of desired size, shape and arrangement formed in the light-reducing material 15, as plainly indicated in Fig. 2, or the light-transmitting portion 16 may be formed by having the desired portion of the lenses made of clear glass, as indicated in Fig. 3. In this form of my invention the portion 16 for the unobstructed passage of light may be a separate piece of clear glass or similar material inserted in an aperture formed in the main or light-reducing portion 15, or it may obviously be formed by using a lens of material adapted to freely transmit the light and stain or tint the portion which is to be the light-reducing portion and leaving clear the portion that is to give clear or unobstructed vision.

For most purposes the clear vision portions will be located centrally in the lenses of the spectacles, as indicated in Figs. 1 to 9, but it will be obvious that where occasion requires they may be located off from the center, as indicated in Fig. 10.

For general purpose the clear vision portion 16 will be circular in shape as indicated in Fig. 1, but for special purposes other shapes for the clear vision portions may be used, as indicated in Figs. 7, 8 and 9. A relatively long, narrow, clear vision portion such as shown in Fig. 7 will obviously give a clear view of a correspondingly shaped portion of the entire field of vision, namely, of considerable extent horizontally but narrow vertically. Such a lens might be used for instance by a person on the water or on ice to eliminate reflection of light from most of the sky and from most of the foreground. A lens with the clear vision portion shaped as shown in Fig. 8 would be used by a person desiring to eliminate the undesired reflection of light from both sides of the field of vision but wishing a greater range up and down. A lens such as shown in Fig. 10 with the clear vision portion below the center of the lenses would be used by a person who wished a clear vision of things directly in front and below the level of the eye. Such for instance, as where a workman has to examine carefully articles before him on a bench or table and needs some protection from excessive light in the room when his eyes are raised.

Fig. 4 shows a light-reducing portion 15 applied to the rear or curved surface of an ordinary lens 17 leaving a clear vision portion 16 in the central part of the lenses where the glass, celluloid or stain used to form the light-reducing portion 15 is omitted. It will be seen that in this embodiment of my invention it does not in any wise interfere with the ordinary lenses 17 performing its usual function.

Fig. 5 shows my invention combined with an ordinary lens but with a clear vision portion 16 flush with the surrounding light-reducing portion 15.

Fig. 6 shows how a pair of spectacles embodying my invention may be used in conjunction with ordinary glasses by arranging a pair of my spectacles in front of the ordinary glasses.

In any form of my invention the user of the spectacles has a certain part of the field of vision entirely clear or unobstructed, while from the rest of the field of vision the light is reduced or modified as desired. By slight adjustment of the spectacles upon the face or by turning or lowering or raising the head the clear vision portion may be moved so as to give a clear vision of or direct light from any part of the field of vision or to cut off excessive light from any direction.

Spectacles of the form I have described will be useful under many conditions to persons driving automobiles, particularly one driving at night, since the clear vision portion may be turned just enough to avoid the direct glare of approaching lights and yet allow the person to see the said light and its surroundings.

Another place where spectacles of this character may be used with advantage is by people viewing moving pictures in that the main portion of the lenses reduces the glare from most of the screen while the clear vision portion allows the spectator to clearly see the particular part of the picture in which he may be interested. A further effect when the spectacles are used in viewing moving pictures is to greatly reduce or entirely eliminate the flicker and to prevent the headaches and eye-strain which often come from attendance upon moving pictures.

Fig. 11 illustrates another embodiment of my invention in that the clear vision portion 16 is located off of the center of the main or light-reducing portion 15 and the lenses are adjustably mounted in the frames 10 so that the clear vision portion by rotating the lenses in the frames may be adjusted to fit different requirements of the eyes or different conditions of light or work. Set screws 18 in the side projections 14 are provided to normally hold the lens from movement in the frame. Upon these set screws 18 being loosened the upper and lower portions of the frame are allowed to separate enough on that side of the frame to allow of the lenses being rotated in the frames to the desired point. Upon the lenses being adjusted as desired the set screws 18 are again tightened to securely hold the lenses. In Fig. 11 the clear vision portions are shown in full lines at their outermost position and on a line with the center of the lens. In dotted lines is shown the position these clear vision portions would assume upon the lens being moved half-way around bringing the clear vision portions at their innermost positions. This adjustability enables such a pair of spectacles to be readily adapted for use by people having their eyes at different distances apart. It will be obvious that the spectacles shown in Fig. 11 may have the lens rotated to any extent required, bringing the clear vision portion off of the center either above or below as may be needed by conditions of work or of light.

What I claim as new and what I desire to secure by Letters Patent is:

Spectacles or the like provided with frames and provided with lenses therein composed in the main of light-reducing material but having a portion for the unobstructed passage of light therethrough, said clear vision portion being located off the center of the lenses and said lenses being adjustably mounted in the frames of the spectacles In witness whereof I have affixed my signature, in the presence of two witnesses, this 9th day of March, 1915.

JOSEPH McWENIE.

Witnesses:
S. E. HOOKS.
HARRIET WILLIAMS.